US00RE34921E

United States Patent [19]

Lamusga et al.

[11] E Patent Number: Re. 34,921

[45] Reissued Date of Patent: May 2, 1995

[54] CUTTING REEL SUSPENSION WITH ADJUSTABLE SPRING DOWNLOADING

[75] Inventors: Gary R. Lamusga, Eden Prairie; Daniel E. Peterson, Northfield, both of Minn.

[73] Assignee: The Toro Company, Bloomington, Minn.

[21] Appl. No.: 71,143

[22] Filed: Jun. 1, 1993

Related U.S. Patent Documents

Reissue of:

[64] Patent No.: 5,042,236
Issued: Aug. 27, 1991
Appl. No.: 478,233
Filed: Feb. 8, 1990

[51] Int. Cl.[6] ..... A01D 75/30

[52] U.S. Cl. ..... 56/7; 56/2; 56/12.7; 56/13.8; 56/14.7

[58] Field of Search ..... 56/6, 7, 12.6, 12.7, 56/13.8, 14.7, 15.7

[56] References Cited

U.S. PATENT DOCUMENTS

| | | | |
|---|---|---|---|
| 1,210,879 | 1/1917 | Worthington | 56/7 |
| 1,293,287 | 2/1919 | Worthington | 56/7 |
| 1,330,293 | 2/1920 | Worthington | 56/7 |
| 1,446,265 | 7/1923 | Murphy | 56/7 |
| 1,900,726 | 3/1933 | Moyer | 56/7 |
| 1,904,376 | 4/1933 | Kruckemeyer | 56/7 |
| 2,130,116 | 9/1938 | Blydenburgh | 56/7 |
| 2,139,200 | 12/1938 | Moyer | 56/7 |
| 2,155,183 | 4/1939 | Dursch | 56/6 |
| 2,168,706 | 8/1939 | George et al. | 56/7 |
| 2,259,553 | 10/1941 | Clapper | 56/7 |
| 2,991,612 | 7/1961 | Holmes | 56/11.4 |
| 3,058,281 | 10/1962 | Lewis | 56/7 |
| 3,613,340 | 10/1971 | Akgulian et al. | 56/12.6 |
| 3,654,749 | 4/1972 | Ostergren et al. | 56/15.8 |
| 3,668,844 | 6/1972 | Akgulian et al. | 56/7 |
| 3,905,180 | 9/1975 | Akgulian et al. | 56/7 |
| 4,021,996 | 5/1977 | Barlett et al. | 56/7 |
| 4,161,858 | 7/1979 | Gerrits | 56/7 |
| 4,384,443 | 5/1983 | Hoogstrate | 56/7 X |
| 4,546,601 | 10/1985 | Skovhoj | 56/6 |
| 4,747,257 | 5/1988 | Hutchison | 56/15.8 |
| 4,769,976 | 9/1988 | Bassett et al. | 56/7 |
| 4,777,786 | 10/1988 | Arnold | 56/7 |
| 4,866,917 | 9/1989 | Phillips et al. | 56/7 |
| 4,947,630 | 8/1990 | Rich et al. | 56/7 X |
| 5,133,174 | 7/1992 | Parsons | 56/7 X |

FOREIGN PATENT DOCUMENTS 692111 5/1953 United Kingdom .

OTHER PUBLICATIONS

Jacobsen LF-100 Brochure, Jacobsen Div. of Textron, 1988.

*Primary Examiner*—Roger J. Schoeppel
*Attorney, Agent, or Firm*—David George Johnson

[57] ABSTRACT

A lift arm assembly (30, 32) for a commercial riding mower includes pivotal lift arms (36, 38, 40, 120), each of which is biased downwardly by an adjustable spring arrangement for better control and contact between the underlying turf and the cutting reels supported on the outer ends of the lift arms.

19 Claims, 4 Drawing Sheets

CUTTING REEL SUSPENSION WITH ADJUSTABLE SPRING DOWNLOADING

Matter enclosed in heavy brackets [ ] appears in the original patent but forms no part of this reissue specification; matter printed in italics indicates the additions made by reissue.

TECHNICAL FIELD

[Present] *The present* invention relates generally to a support assembly. More particularly, this invention concerns a suspension assembly for supporting the cutting reels of a commercial mower while biasing the reels downwardly by adjustable springs in order to achieve better terrain following at higher speed.

BACKGROUND ART

Commercial riding mowers of the type used on golf courses are relatively large machines which utilize cutting reels as opposed to rotary blades. Two or three such cutting reels are typically provided across the front of the mower, with one or more cutting reels being positioned in trailing relationship behind the gaps between the cutting reels in the front. In order for the cutting reels to be effective, they must of course be in direct contact with the grass at all times, following the contour and undulations of the terrain as the mower is driven along. The Toro Company, which is the assignee hereof, manufactures and sells several examples of such mowers.

It will be appreciated that the speed of such mowers, and thus the time necessary to cut a particular tee or fairway on a golf course, for example, depends upon the ability of their cutting units to follow the terrain. This in turn depends upon the roughness of the terrain, type of grass and its degree of wetness, cutting height, etc. Cutting the grass on a golf course is a recurring, and time consuming task. While the grass is being cut, that particular tee or fairway is taken out of service and so it is desirable to drive the mower as fast as possible while maintaining the desired cutting height.

In the past, the cutting reels were relatively heavy and thus tended to follow the contours of the ground satisfactorily up to a certain speed. Additional weight was sometimes added to help them follow the ground contours, however, this made the cutting reels difficult to repair and replace. It also increased the overall weight of the mower, thus decreasing [manueverability] *maneuverability* and causing undue compaction of the soil.

More recently, lightweight cutting reels, which can be easily removed for replacement and repair as necessary, have become available. In addition, such [ligh] *light* weight cutting reels have helped to reduce overall weight of the mower and undue soil compaction, while improving maneuverability. On the other hand, such lightweight cutting reels have some drawbacks in terms of quality of cut and maintaining the desired cutting height because they tend to ride above the ground surface cushioned by a layer of grass. Merely adding extra weight is at cross purposes to the advantages of lightweight cutting reels.

Various counterweight and counterbalance arrangements have been utilized for this purpose in the past. For example, U.S. Pat. Nos. 1,210.879, 1,293,287 and 1,330,293 to Worthington and 1,446,265 to Murphy are representative of the prior art in this regard. Such arrangements have tended to be overly complicated and expensive.

A need has thus arisen for an improved arrangement for downloading lightweight cutting reels by means of adjustable spring assemblies in order to effect optimal cutting.

SUMMARY OF THE INVENTION

The present invention comprises a suspension system for supporting the cutting reels of a commercial mower, which overcomes the foregoing and other difficulties associated with the prior art. In accordance with the invention, there is provided a cutting reel suspension system comprising a plurality of pivotal lift arms carrying individual cutting reels thereon which are normally biased downwardly by adjustable spring assemblies coupled directly between the lift arms and the mower frame in order to minimize unsprung weight and thus improve responsiveness so that the mower can be operated at a faster speed while maintaining cutting quality.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
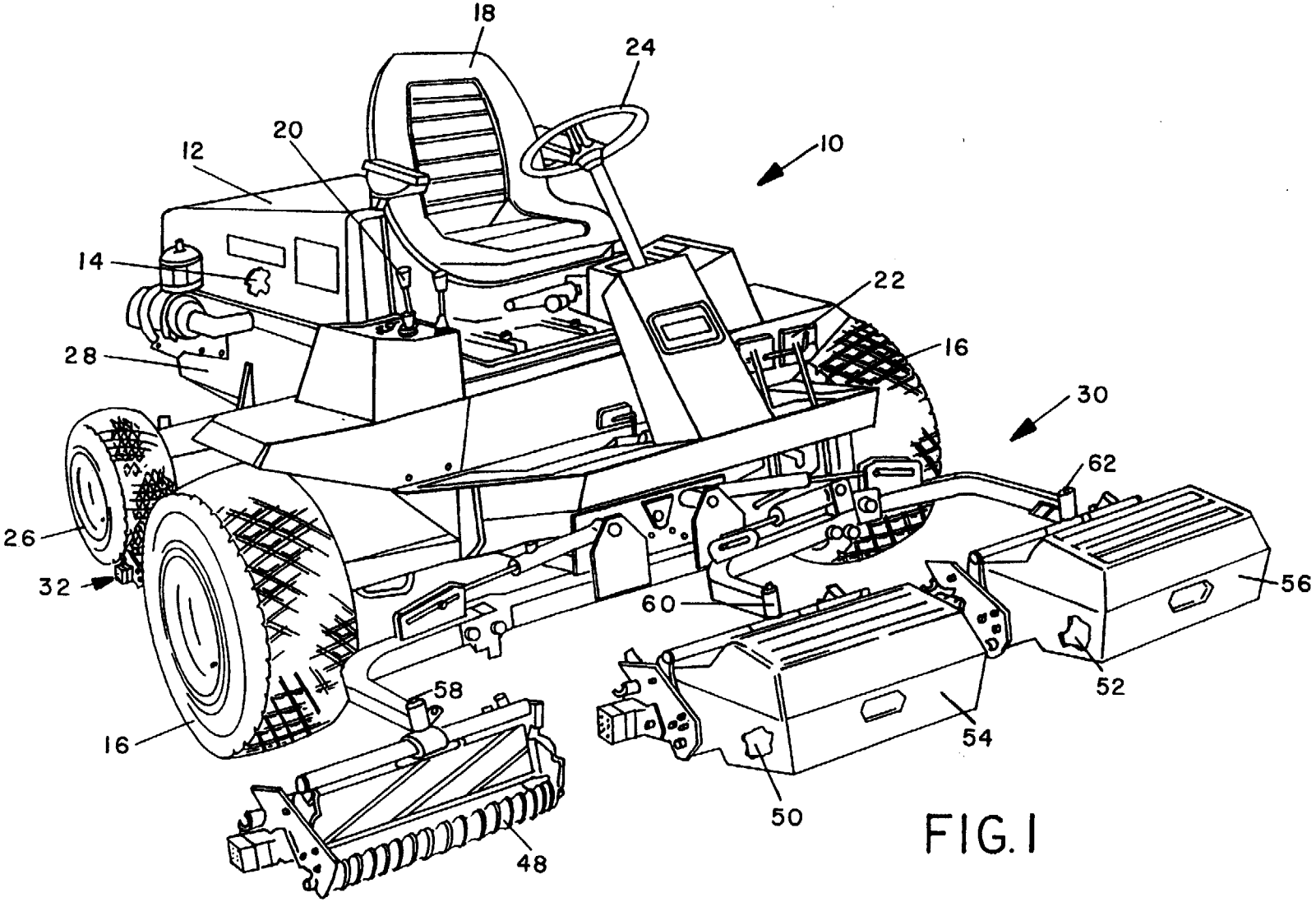
FIG. 1 is a perspective view of a commercial riding turf mower incorporating the cutting reel suspension system of the invention.

Referring now to the Drawings, wherein like reference numerals designate like or corresponding elements throughout the views, and particularly referring to FIG. 1, there is shown a commercial riding mower 10 of the type with which the invention herein is particularly useful. Such mowers are typically utilized for cutting large areas such as golf courses, football fields, parks and the like. The mower 10 includes a rear housing 12 enclosing an engine 14 which is coupled via a transmission (not shown) to a pair of front driving or traction wheels 16. The operator sits in a seat 18 positioned in front of the engine housing 12 and controls operation of the mower 10 by means of hand controls 20, foot controls 22, and a steering wheel 24 which is coupled to a pair of rear steering wheels 26, only one of which is shown. The rear steering wheels 26 are of relatively smaller diameter and tread than the front traction wheels 16, for purposes of better maneuverability. The mower 10 includes a frame having a projecting forward platform on which the foot controls 22 and the pedestal for steering wheel 24 are mounted. A front lift arm assembly 30 is mounted on the front end of frame 28 ahead of wheels 16, while a rear lift arm assembly 32 is mounted on the frame between the front wheels and the rear wheels 26. As will be explained more fully hereinafter, the lift arm assemblies 30 and 32 incorporate lightweight cutting reels mounted on pivotal lift arms that are normally biased by adjustable spring assemblies downwardly into contact with the turf in order to achieve better responsiveness and thus better cutting quality at higher speeds.

Figure 2:
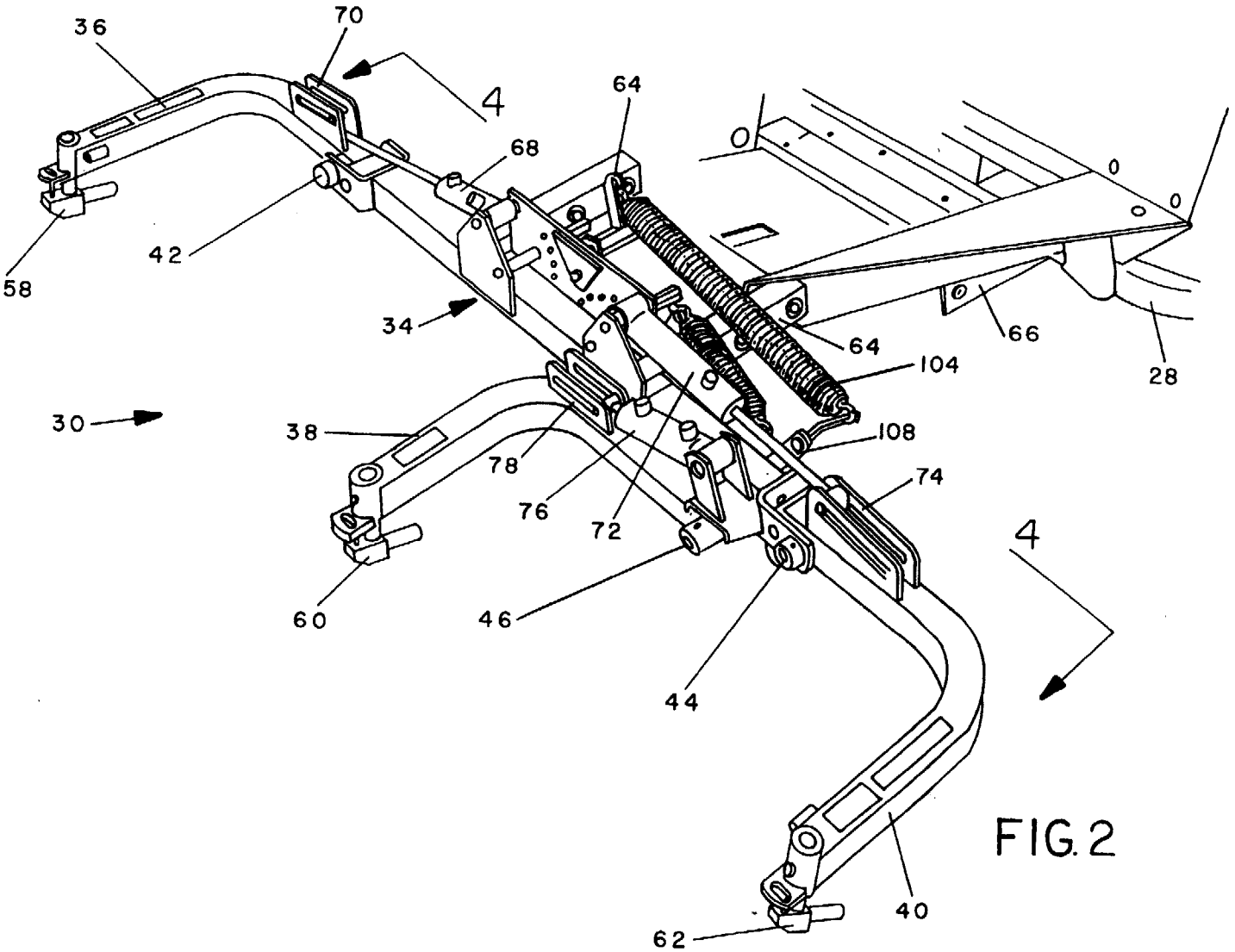
FIG. 2 is a perspective view of the front lift arm assembly.
Figure 3:
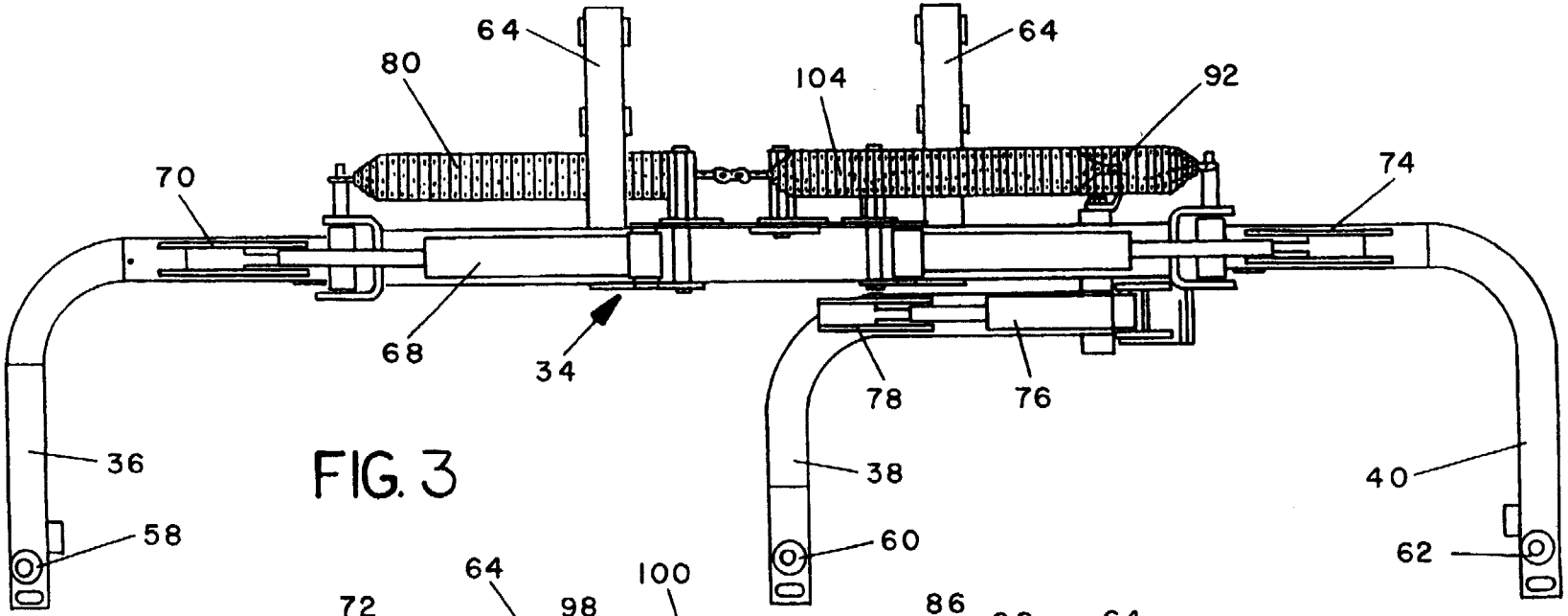
FIG. 3 is a top view of the front lift arm assembly.
Figure 4:
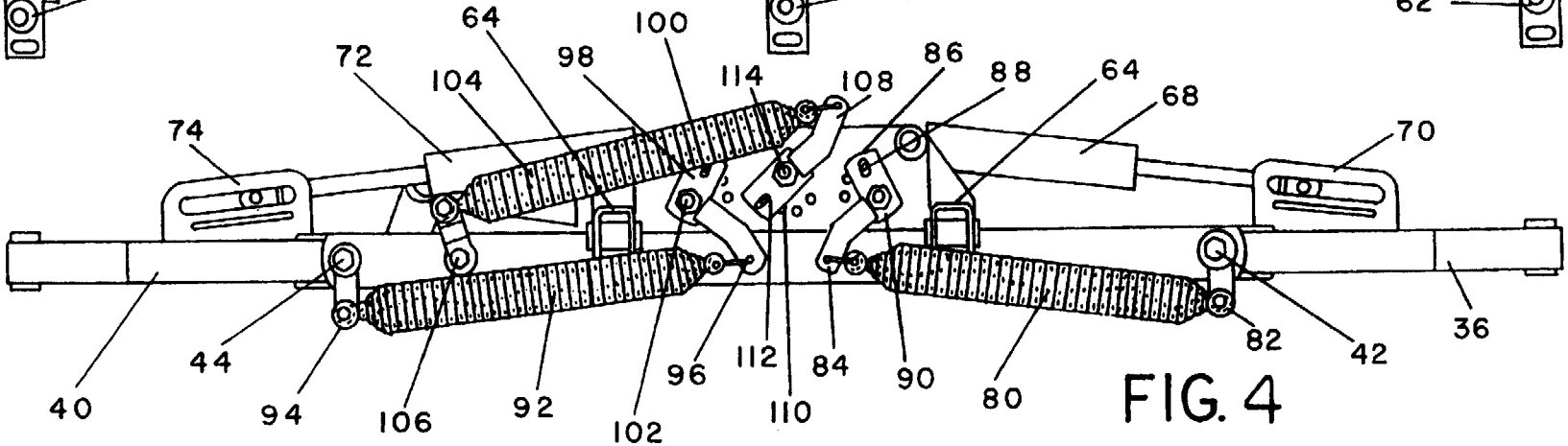
FIG. 4 is a rear elevational view of the front lift arm assembly, taken generally along lines 4—4 of FIG. 2 in the direction of the arrows.

Referring now to FIGS. 2–4, as well as FIG. 1, the front lift arm assembly 30 includes a subframe 34 which is mounted on the main frame 28 of mower 10 and which commonly supports the pivotal lift arms 36, 38 and 40 thereon. Each lift arm 36, 38 and 40 is of generally L-shaped configuration, having opposite inner and outer ends. The inner ends of the outboard lift arms 36 and 40 are connected by pivots 42 and 44, respectively, to the outer ends of the subframe 34. The inner end of the middle lift arm 38 is also mounted on the subframe 34 by means of pivot 46 located between pivots 42 and 44, such that the lift arms 36, 38 and 40 are arranged in side-by-side relationship across the lift arm assembly 30. The lift arms 36, 38 and 40 are thus pivotal about generally longitudinal axes between raised and lowered positions.

A lightweight cutting reels is mounted on the outer end of each of the lift arms of the front lift arm assembly 30. In particular, cutting reel 48 is secured to the outer end of the right outboard lift arm 36, cutting reel 50 is secured to the outer end of the middle lift arm 38, and cutting reel 52 is mounted on the outer end of the left outboard lift arm 40. Each of the cutting reels 48, 50 and 52 is of substantially conventional construction, including hydraulically driven transverse blades positioned between front and rear transverse rollers. Such cutting reels 48, 50 and 52 are usually enclosed by safety guards, only two of which guards 54 and 56 are shown in FIG. 1 for purposes of clarity.

In accordance with the preferred construction, each of the cutting reels 48, 50 and 52 are mounted on the outer ends of their respective lift arms by swivel connections 58, 60 and 62 about upright and rearwardly extending axes simultaneously to provide a floating and castering action, which comprises a significant feature of the present invention.

The subframe 34 includes a pair of spaced-apart, longitudinal rearwardly extending tubular members 64 which are adapted for receipt in channel members 66 provided on the front end of frame 28. It will thus be appreciated that the front lift arm assembly 30 is mounted as a unit on the front end of the mower frame 28, for ease of removal and replacement if necessary.

Each of the lift arms 36, 38 and 40 is provided with a separate hydraulic actuator for controlling pivotal movement thereof. For example, cylinder 68 is coupled between subframe 34 and a slot or lost motion connection 70 on the right outboard lift arm 36. Similarly, cylinder 72 is coupled between subframe 34 and a slotted or lost motion connection 74 on the left outboard lift arm 40. Cylinder 76 is coupled between subframe 34 and another slotted or lost motion connection 78 on the middle lift arm 38. These actuators thus function to raise and lower the lift arms between their extreme positions, while at the same time affording a range of pivotal travel in accordance with the contour of the underlying surface.

Each of the lift arms in the front lift arm assembly 30 also includes a spring assembly coupled between the lift arm and subframe 34 for applying an adjustable downward bias to the lift arm in order to urge the cutting reel thereon into contact with the underlying surface. This comprises a significant feature of the present invention. In accordance with the preferred embodiment, a tension spring 80 is connected between a crank 82 on the right outboard lift arm 36 and another crank 84 on a pivotal bracket 86 which is adjustably secured to the subframe 34 by means of an array of registering holes therebetween for receiving nuts and bolts 88 in accordance with the desired tension on the spring 80. A wrench surface 90 is preferably provided on the pivotal bracket 86 to facilitate adjustment. Another spring 92 is similarly connected between a crank 94 on the left outboard lift arm 40 and a crank 96 on a pivotal bracket 98 adjustably secured to the subframe 34 by registering holes as shown, a nut and bolt 100 and a wrench surface 102. Similarly, another tension spring 104 is connected between a crank 106 on the middle lift arm 38 and another crank 108 on a pivotal bracket 110 secured to the subframe 34 by registering holes, nut and bolt 112, and wrench surface 114. It will thus be appreciated that each of the lift arms of the front lift arm assembly 30 can be individually adjusted to apply the desired downward spring bias. In addition, because the various cylinders and springs are carried primarily by the subframe 34, which is carried directly on the mower frame 28, this arrangement minimizes unsprung weight for better responsiveness. This improves the dynamic response of the lift arms.

Figure 5:
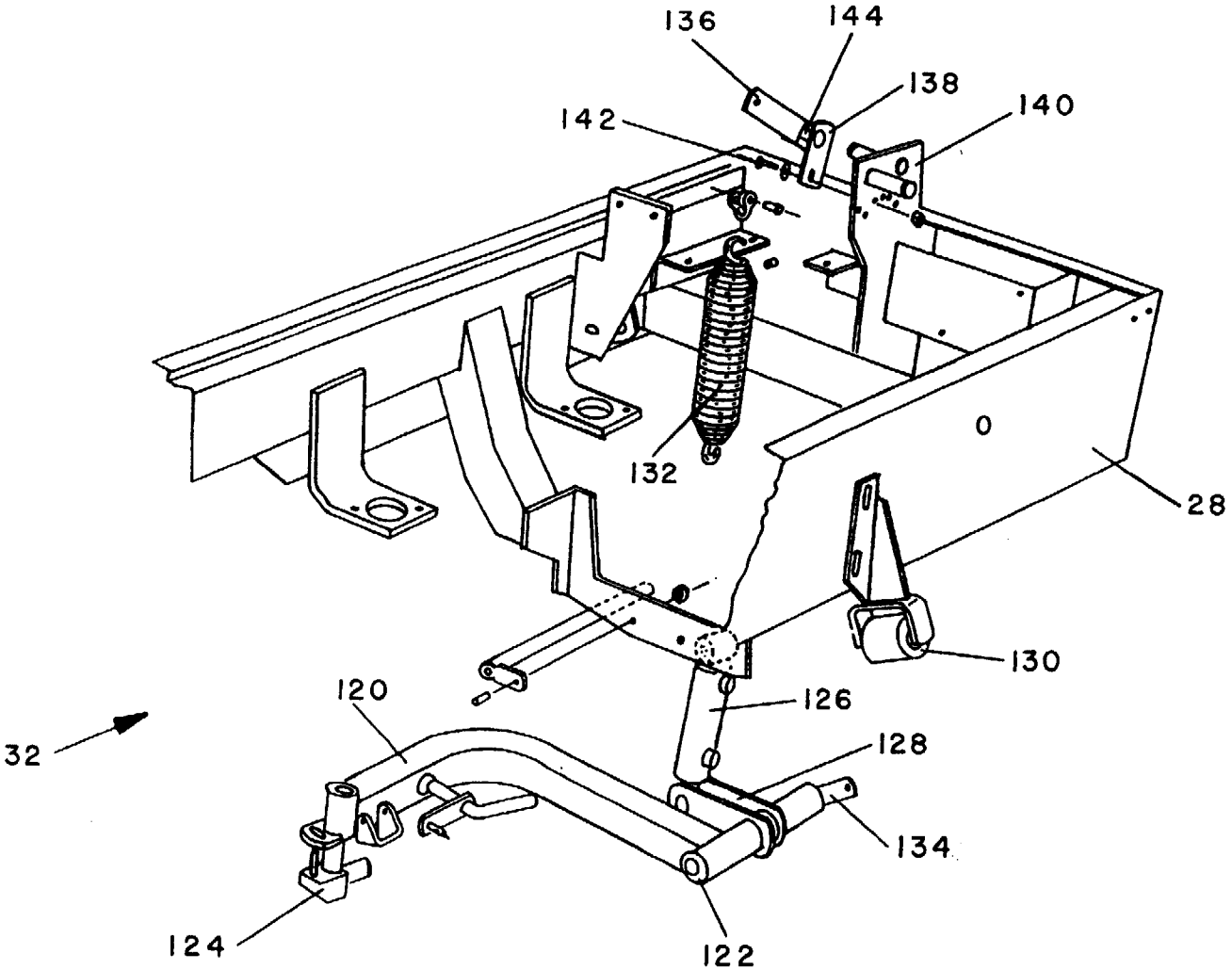
FIG. 5 is a perspective view of the rear lift arm assembly, wherein the left rear lift arm has been omitted for purposes of clarity.

Referring now to FIG. 5, there is shown the rear lift arm assembly 32 which is mounted on the mower frame 28 between the front wheels 16 and rear wheels 26. The rear lift arm assembly 32 includes left and right lift arms 120, only one of which is shown, but both of which are supported and biased downwardly by hydraulic actuators and adjustable spring assemblies similar to those in the front lift arm assembly 30. In particular, the right lift arm 120 includes an inner end which is connected by pivot 122 directly to the mower frame 28. A swivel connection 124 is provided at the outer, forward end of lift arm 120 for supporting a cutting reel (not shown) similar to cutting reels 48, 50 or 52. A cylinder 126 is coupled between frame 28 and a slotted or lost motion connection 128 on the lift arm 120 for effecting pivotal movement thereof between extreme raised and lowered positions, while allowing free pivotal movement therebetween. A stop (not shown) similar to the left stop 130 is provides on the right side of frame 28 for limiting upward pivotal movement of the right rear lift arm 120. A tension spring 132 is connected between a crank 134 on the lift arm 120, and another crank 136 on a pivotal bracket 138 which is adjustably secured to a lug 140 on frame 28 by means of registering holes as shown, a nut and bolt 142, and a wrench surface 144. It will thus be appreciated that the downward spring loading on the rear lift arms 120 can also be individually [be] adjusted as necessary in accordance with the terrain being mowed.

From the foregoing, it will thus be appreciated that the present invention comprises an improved cutting reel suspension system having several advantages over the prior art. The suspension system herein minimizes unsprung weight on the cutting reels, while at the same time providing for individual adjustable downward spring biasing thereon in order to achieve better control. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and- /or rearrangements of elements falling within the scope of the invention as defined by the following claims.

What is claimed is:

1. A lift arm assembly for a turf mower, having a frame comprising:

a subframe adapted for attachment to the frame of the mower;

a plurality of lift arms arranged generally side-by-side, each lift arm including inner and outer ends;

means for pivotally securing the inner end of each lift arm to said subframe for pivotal movement between raised and lowered positions;

a plurality of cutting reels;

means for pivotally securing one of said cutting reels to the outer end of each of said lift arms;

means coupled between each lift arm and said subframe for effecting relative pivotal movement thereof; and means coupled between said subframe and each lift arm for normally biasing the outer ends of the lift arm and cutting reel suspended thereon toward the lowered position.

2. The lift arm assembly of claim 1, wherein said subframe comprises:

a transverse member having opposite outer ends;

the inner ends of said lift arms being pivotally secured to the outer ends of said transverse member; and means for securing said transverse member to the frame of the mower.

3. The lift arm assembly of claim 1, wherein said lift arms are of generally L-shaped configuration.

4. The lift arm assembly of claim 1, wherein said means for pivotally securing said cutting reels to said lift arms comprises:

swivel connection means for supporting said cutting reels for pivotal movement simultaneously about both upright and rearwardly extending axes; and stop means for limiting pivotal movement of said swivel connection means about the upright axis.

5. The lift arm assembly of claim 1, wherein said means for effecting pivotal movement of said lift arm comprises:

a cylinder having opposite base and rod ends, the base end being pivotally secured to said subframe; and lost motion connection means coupled between the rod end and the respective lift arm.

6. The lift arm assembly of claim 1, wherein each of said biasing means comprises:

a crank arm secured at one end to the respective lift arm; and a tension spring connected between the other end of said crank arm and said subframe.

7. The lift arm assembly of claim 1, further including:

means for selectively adjusting the amount by which the outer ends of said lift arm are biased downwardly.

8. A cutting reel lift arm assembly for a turf mower, comprising:

a plurality of L-shaped lift arms arranged side-by-side, each lift arm including inner and outer ends;

means for supporting the inner ends of said lift arms for pivotal movement about generally longitudinal axes between raised and lowered positions;

a plurality of cutting reels;

means for pivotally securing one of said cutting reels to the outer end of each of said lift arms; means for selectively effecting relative pivotal movement of each of said lift arms;

a plurality of springs, each spring being connected at one end to one of said lift arms in order to normally bias the outer end thereof and the respective cutting reel suspended thereon toward the lowered position; and means connected to the other end of each lift arm for selectively adjusting the amount by which said lift arm is biased downwardly by the respective spring.

9. The cutting reel lift arm assembly of claim 8, wherein said means for pivotally securing said cutting reels to said lift arm comprises:

swivel connection means for supporting said cutting reels for pivotal movement simultaneously about both upright and rearwardly extending axes; and stop means for limiting pivotal movement of said swivel connection means about the upright axis.

10. The cutting reel lift arm assembly of claim 9, wherein said means for selectively accepting pivotal movement of said lift arm comprises:

a cylinder having opposite base and rod ends, the base end being pivotally secured to said supporting means; and lost motion connection means coupled between the rod end and the respective lift arm.

11. The cutting reel lift arm assembly of claim 8, wherein each of said springs comprises a tension spring.

12. The cutting reel lift arm assembly of claim 8, wherein said means for selectively adjusting the amount of bias comprises:

a crank pivotally secured to said supporting means, said crank having two outwardly extending arms;

the said other end of the respective spring being connected to one arm of said crank; and means for selectively securing the other arm of said crank to said supporting means in different predetermined pivotal positions in order to adjust spring tension as desired.

13. A cutting reel lift arm assembly for a turf mower, having a frame comprising:

a transverse subframe adapted for attachment to the frame of the mower;

a plurality of L-shaped lift arms arranged generally side-by-side, each lift arm including inner and outer ends;

means for pivotally securing the inner end of each lift arm to said subframe for pivotal movement between raised and lowered positions;

a plurality of cutting reels;

means for securing one of said cutting reels to the outer end of each of said lift arms;

means coupled between each lift arm and said subframe for selectively effecting relative pivotal movement thereof;

a plurality of springs, each spring being connected at one end to one of said lift arms in order to normally bias the outer end thereof and the respective cutting reel suspended thereon toward the lowered position; and means coupled between said subframe and the other end of each of said springs for selectively adjusting spring tension as desired.

*14. A lift arm assembly for a turf mower having a frame, comprising:*

*(a) at least one lift arm, each lift arm including inner and outer ends;*

*(b) means for pivotally securing the inner end of each lift arm to the frame for pivotal movement between raised and lowered positions;*

*(c) at least one cutting reel;*

*(d) means for pivotally securing one of said cutting reels to the outer end of each of said lift arms;*

*(e) means coupled between each lift arm and said frame for effecting relative pivotal movement thereof; and*

*(f) means coupled between said frame and each lift arm for normally biasing the outer ends of the lift arm and cutting reel suspended thereon toward the lowered position.*

*15. The lift arm assembly of claim 14, wherein the means for pivotally securing the inner end of each lift arm to the frame comprises at least one subframe, the subframe being adapted for attachment of the mower frame to at least one lift arm.*

*16. The lift arm assembly of claim 15, further comprising a plurality of lift arms arranged generally side by side.*

*17. The lift arm assembly of claim 16, wherein at least one lift arm is coupled to the frame by means of a hydraulic cylinder.*

*18. The lift arm assembly of claim 17, wherein the means for effecting pivotal movement of the lift arm comprises a cylinder having opposite base and rods ends, the base end being pivotally secured to the mower frame and the rod end being pivotally attached to the lift arm.*

*19. The lift arm assembly of claim 18, further including means for selectively adjusting the amount by which the outer end of the lift arm is biased downwardly.*

* * * * *